(12) United States Patent
Zheng

(10) Patent No.: US 8,958,828 B2
(45) Date of Patent: Feb. 17, 2015

(54) SELF-AWARE PROFILE SWITCHING ON A MOBILE COMPUTING DEVICE

(75) Inventor: Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/248,986

(22) Filed: Sep. 29, 2011

(65) Prior Publication Data

US 2012/0115453 A1     May 10, 2012

Related U.S. Application Data

(63) Continuation of application No. 12/943,529, filed on Nov. 10, 2010.

(51) Int. Cl.

| | |
|---|---|
| H04W 64/00 | (2009.01) |
| H04M 1/725 | (2006.01) |
| H04W 4/02 | (2009.01) |
| H04W 4/18 | (2009.01) |
| H04W 4/20 | (2009.01) |
| H04L 29/08 | (2006.01) |

(52) U.S. Cl.
CPC ...... *H04M 1/72569* (2013.01); *H04M 1/72572* (2013.01); *H04W 4/02* (2013.01); *H04W 4/185* (2013.01); *H04W 4/206* (2013.01); *H04L 67/306* (2013.01); *H04M 2250/12* (2013.01)
USPC ................ 455/456.4; 455/456.6; 455/435.1; 455/433; 455/456.1; 340/310.11

(58) Field of Classification Search
None
See application file for complete search history.

(56) References Cited

U.S. PATENT DOCUMENTS 7,221,939 B2 *   5/2007   Ylitalo et al. .............. 455/435.1
8,478,306 B2     7/2013   Zheng
(Continued)

FOREIGN PATENT DOCUMENTS

CN     101088272     12/2007
CN     101632074     1/2010
(Continued)

OTHER PUBLICATIONS

'phoneAlarm Pro- profiles, alarms and more' [online]. PocketMax, 2010, [retrieved on Nov. 9, 2011]. Retrieved from the internet: <URL: http://www.pocketmax.net/phonealarm.html>. 2 pages.
(Continued)

*Primary Examiner* — Kent Chang
*Assistant Examiner* — Benjamin Morales Fernandez
(74) *Attorney, Agent, or Firm* — Fish & Richardson P.C.

(57) ABSTRACT

In one implementation, a computer-implemented method includes detecting, by a mobile computing device, a current context associated with the mobile computing device, the current context being external to the mobile computing device and indicating a current state of the mobile computing device in its surrounding environment. The method can also include identifying, based on at least a first portion of the current context, a location description for the mobile computing device, wherein the location description includes a textual description of the location; and determining, based on the identified location description and at least a second portion of the current context, whether to switch the mobile computing device from operating using a current profile to operating using a second profile, wherein the current profile and the second profile each define one or more settings of the mobile computing device.

18 Claims, 8 Drawing Sheets

(56) References Cited

U.S. PATENT DOCUMENTS

| | | |
|---|---|---|
| 2003/0008662 A1* | 1/2003 | Stern et al. .................... 455/456 |
| 2004/0203768 A1* | 10/2004 | Ylitalo et al. .............. 455/435.1 |
| 2005/0215243 A1 | 9/2005 | Black et al. |
| 2006/0107219 A1 | 5/2006 | Ahya et al. |
| 2006/0234758 A1* | 10/2006 | Parupudi et al. ........... 455/550.1 |
| 2007/0082668 A1* | 4/2007 | Silver et al. ................ 455/432.3 |
| 2007/0255807 A1* | 11/2007 | Hayashi et al. ............... 709/219 |
| 2008/0070593 A1* | 3/2008 | Altman et al. ................ 455/457 |
| 2008/0180228 A1* | 7/2008 | Wakefield et al. ....... 340/310.11 |
| 2008/0242317 A1* | 10/2008 | Abhyanker ............... 455/456.3 |
| 2009/0170532 A1 | 7/2009 | Lee et al. |
| 2010/0041378 A1 | 2/2010 | Aceves et al. |
| 2010/0064007 A1 | 3/2010 | Randall |
| 2010/0144323 A1 | 6/2010 | Collins et al. |
| 2010/0317371 A1* | 12/2010 | Westerinen et al. ....... 455/456.6 |
| 2010/0319053 A1* | 12/2010 | Gharabally ....................... 726/4 |
| 2011/0078184 A1 | 3/2011 | Song et al. |
| 2011/0161167 A1 | 6/2011 | Jallapuram |
| 2011/0283192 A1 | 11/2011 | Yu et al. |
| 2012/0226623 A1 | 9/2012 | Jurney et al. |

FOREIGN PATENT DOCUMENTS

| | | |
|---|---|---|
| WO | WO 2009/063262 | 5/2009 |
| WO | WO2009/077848 | 6/2009 |
| WO | WO 2010/075174 | 7/2010 |

OTHER PUBLICATIONS

'Timing is Everything! SBSH Reminders for S60 Now Available!' [online]. SBSH, 2009, [retrieved on Nov. 9, 2011]. Retrieved from the internet: <URL:http://www.sbsh.net/press/111/Reminders_for_S60>. 2 pages.

Search Report in United Kingdom Application No. 1309071.7, mailed on Jan. 21, 2014, 4 pages.

International Search Report and Written Opinion in International Application No. PCT/US2011/059579, mailed May 25, 2012, 16 pages.

Office Action issued in Chinese Application No. 201180064111.3 on Oct. 23, 2014, 21 pages (with English translation).

* cited by examiner

SELF-AWARE PROFILE SWITCHING ON A MOBILE COMPUTING DEVICE

CROSS-REFERENCE TO RELATED APPLICATIONS

This application is a continuation of and claims priority under 35 U.S.C. §120 to U.S. application Ser. No. 12/943,529, filed on Nov. 10, 2010, the entire contents of which are hereby incorporated by reference.

TECHNICAL FIELD

This document generally describes methods, systems, and techniques for self-aware profile switching on a mobile computing device, such as a mobile telephone.

BACKGROUND

Mobile computing devices (e.g., mobile telephones, smart telephones, personal digital assistants (PDAs), portable media players, etc.) have been configured to allow users to manually adjust one or more device settings (e.g., ringer, display brightness, vibrate feature, etc.). For example, mobile computing devices have been configured with switches, dials, and buttons on their housings that users can use to manually adjust device settings like ringer volume, display brightness, ringer activation (ringer on/off), and speakerphone activation (speaker and microphone on/off).

SUMMARY

In the techniques described in this document, the context of a mobile computing device, such as a mobile telephone (e.g., smart phone, or app phone), is taken into consideration in order to automatically determine when and how to adjust a profile for the mobile computing device. A profile for a mobile computing device defines a collection of settings for the mobile device, such as ringer volume, display brightness, and a type of network (e.g., 3G/4G network, cellular network, wifi network, etc.) to which the device should attempt to connect.

An automatic determination is a determination made without explicit user direction. Instead of waiting for a user to prompt the mobile computing device to change its settings, in the techniques described in this document a mobile computing device can automatically determine when and how to change its current profile (the current profile that defines one or more current settings for the mobile computing device) based on a current context associated with the mobile computing device. A current context associated with a mobile computing device (and/or with a user of the mobile computing device) can include a context external to the device, such as information that represents an environment around the device, and/or a context internal to the device such as historical information about the device that is stored in the device. Context external to the device can include, for example, the identities of computing devices that are located near to the mobile computing device (e.g., available wireless networks, devices to which the mobile computing device is tethered, etc.) and motion of the mobile computing device (e.g., accelerating, stationary, etc.). Context that is internal to the device can include recent activity on the mobile computing device (e.g., social network activity, emails sent/received, telephone calls made/received, etc.) and states of the mobile computing device, such as the current battery status (e.g., battery below 5% charge, battery above 50% charge, etc.) and applications that are currently running on the mobile computing device (e.g., running a navigation application, etc.).

For example, when a user arrives home after work with his/her mobile computing device, the mobile device can detect that the current context has changed and adjust the profile being used by the device accordingly. For instance, the mobile computing device may detect a wireless signal for a wireless network named "homenet123" (current context) and, based on the presence of this network, infer that the mobile computing device is located at the user's home. The mobile device can apply one or more rules to the current context to determine a profile that the device should use. A rule indicates a profile preference given a context for the mobile computing device. For example, a rule may indicate that when the device is located at the user's home, the ringer should be on except between 10:00 pm and 6:00 am, during which the device should switch to a silent mode (e.g., ringer off, vibrate off, display at low brightness, etc.).

Furthering the example from the previous paragraph, the mobile computing device described may determine that it is located at the user's home based on a type of dock that the mobile computing device is placed in at the user's home. For instance, the mobile computing device may identify the type of dock based on physical electrical contacts on the dock and device that match each other, or via electronic communication (e.g., via BLUETOOTH or RFID) between the dock and the device. For example, a certain pin arrangement may be provided on a dock intended for home use, while a different arrangement may be provided for a dock intended and sold for in-car use.

With the described techniques, a mobile computing device can learn and use location descriptions to determine how and when to switch profiles for the mobile computing device. Location descriptions include information that describes a location, such as names (e.g., home, work, car, etc.) that are not tied to a specific geographic identifier (e.g., street address, global positioning system (GPS) data, etc.). Location descriptions can be learned and identified by the mobile computing device's surrounding environment and through user actions (e.g., detecting a context when in a scheduled meeting in a particular conference room, user input indicating the name of a location, etc.).

The described techniques can also permit a mobile computing device to learn rules to be used for profile switching. Rules can be learned without explicit user direction, but can instead be inferred through user adjustment of settings on the mobile computing device in light of various changing contexts associated with the mobile computing device.

In one implementation, a computer-implemented method includes detecting, by a mobile computing device, a current context associated with the mobile computing device, the current context being external to the mobile computing device and indicating a current state of the mobile computing device in its surrounding environment. The method can also include identifying, based on at least a first portion of the current context, a location description for the mobile computing device, wherein the location description includes a textual description of the location. The method can further include determining, based on the identified location description and at least a second portion of the current context, whether to switch the mobile computing device from operating using a current profile to operating using a second profile, wherein the current profile and the second profile each define one or more settings of the mobile computing device. The method can additionally include, in response to determining whether to switch to the second profile, adjusting one or more setting of the mobile computing device based on the second profile.

In another implementation, a system for switching profiles on a mobile computing device includes a mobile computing device, and a context determination unit of the mobile computing device that is configured to detect a current context associated with the mobile computing device, the context being external to the mobile computing device and indicating a current state of the mobile computing device in its surrounding environment. The system can also include a location description unit of the mobile computing device that is configured to identify, based on at least a first portion of the current context, a location description for the mobile computing device, wherein the location description includes a textual description of the location. The system can further include a profile rule unit of the mobile computing device that is configured to determine, based on the identified location description and at least a second portion of the current context, whether to switch the mobile computing device from operating using a current profile to operating using a second profile, wherein the current profile and the second profile each define one or more settings of the mobile computing device. The system can additionally include a settings management unit of the mobile computing device that is configured to adjust one or more setting of the mobile computing device based on the second profile in response to determining whether to switch to the second profile.

In another implementation, a computer program product tangibly embodied in a non-transitory machine-readable storage device can include instructions that, when executed, cause operations to be performed. Such operations can include detecting, by a mobile computing device, a current context associated with the mobile computing device, the context being external to the mobile computing device and indicating a current state of the mobile computing device in its surrounding environment. Such operations can also include identifying, based on at least a first portion of the current context, a location description for the mobile computing device, wherein the location description includes a textual description of the location. Such operations can further include determining, based on the identified location description and at least a second portion of the current context, whether to switch the mobile computing device from operating using a current profile to operating using a second profile, wherein the current profile and the second profile each define one or more settings of the mobile computing device. Such operations can additionally include in response to determining whether to switch to the second profile, adjusting one or more setting of the mobile computing device based on the second profile.

The details of one or more embodiments are set forth in the accompanying drawings and the description below. Various advantages can be realized with certain implementations, such as providing users with greater convenience when moving a mobile computing device from one context to another. Instead of having to remember to adjust the mobile device settings to be appropriate for a given location (e.g., turn ringer off while in meeting in conference room, automatically answer a telephone call after a threshold number of rings), the mobile computing device can be aware of the location and adjust the device to the appropriate settings. Users do not have to manually adjust device settings. Instead, the settings can be automatically adjusted for the user by the mobile computing device.

Additionally, a user can, in certain implementations, be provided with greater convenience in generating rules to determine when and how to change between profiles for a mobile computing device. A mobile computing device can learn rules to use for profile switching based on normal user actions—a user would not have to sit down and program the device to switch its settings for a variety of possible scenarios.

Furthermore, a mobile computing device can more accurately switch its profile using location descriptions instead of geographic identifiers. Location descriptions can have a greater level of granularity than do geographic identifiers. For instance, location descriptions can be used to accurately determine a room (e.g., conference room, personal office, etc.) of a building within which the mobile computing device is located, whereas geographic identifiers, such as a street address and GPS data, may merely be able to specify the building itself. Additionally, location descriptions can be used to identify differences between vertically stacked locations (e.g., rooms on different floors of the same building), whereas geographic identifiers may not be capable of providing such a distinction. Moreover, location descriptions may be effective where GPS or similar geographic location data is not available, such as in dense urban areas.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
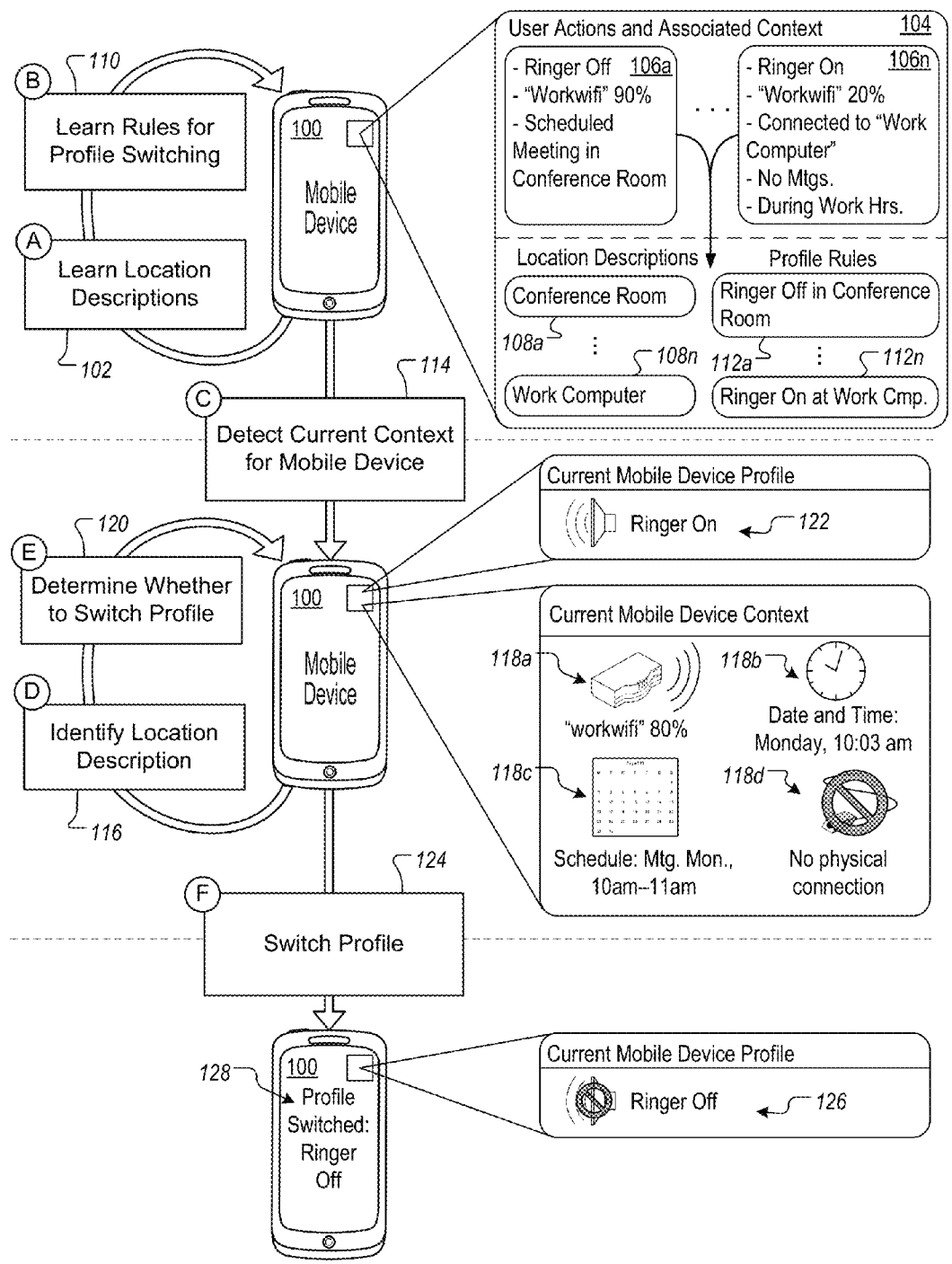
FIGS. 1A-C are conceptual diagrams of example mobile computing devices for automatically switching profiles based on context.

This document describes techniques, methods, systems, and mechanisms for automatically switching profiles (collection of device settings) for a mobile computing device (e.g., mobile telephone, smart telephone (e.g., IPHONE, BLACKBERRY), personal digital assistant (PDA), portable media player (e.g., IPOD), etc.). Determinations regarding when to switch device profiles can be based on a context associated with a mobile computing device (and/or a user of the mobile computing device). For instance, a mobile computing device may automatically switch from an example first profile (max ringer volume, vibrate on) to an example second profile (vibrate on, ringer off) when the context associated with the mobile computing device (and/or a user of the mobile computing device) indicates that the mobile computing device is physically in a location where the second profile is preferred by the user (e.g., in a conference room, in a doctor's office, etc.).

As mobile computing devices have become more central to users' everyday lives, it is not uncommon for a user to carry his/her mobile computing device nearly everywhere he or she travels. For example, users often carry their mobile computing devices with them at home, at work, and at social events. However, it can be difficult for users to constantly remember to adjust their device's profile (collection of device settings—e.g., ringer settings, display settings, speaker settings, microphone settings, automatic telephone call answering settings, etc.) while moving between locations. Failing to appropriately adjust a device's profile in light of the device's current context can be problematic for a user. For example, a cell phone ringer going off during a meeting can be annoying to attendees of the meeting and embarrassing to the cell phone's owner. Additionally, adjusting a device's settings can be cumbersome, depending on a user interface provided by the device for making such adjustments.

The techniques, methods, systems, and mechanisms described in this document allow a mobile computing device to automatically adjust its profile appropriately given the device's current context without relying on a user to do so. A mobile computing device can determine, without explicit user direction at the time of the determination, when and how to switch its profile based on a current context associated with the mobile computing device (and/or a user of the mobile computing device). A current context for a mobile computing device can include a variety of information associated with the mobile computing device and/or a user of the mobile computing device. Such information may be external to the device and be identified by sensors in the device, such as computing devices located nearby (e.g., located near wireless network "testnet2010," etc.), a direction and rate of speed at which the device is travelling (e.g., northbound at 20 miles per hour), a current geographic location (e.g., on the corner of 10th Street and Marquette Avenue), a type of dock to which a mobile computing device is docked (e.g., car-adapted dock), ambient noise (e.g., low-pitch hum, music, etc.), and current images from the mobile computing devices camera(s). This information can additionally be used to identify a location description (e.g., home, work, car, school, conference room, personal office, etc.) where the mobile computing device is located.

The context may be internal to the device, such as determinations made by the device about the time of day and date (e.g., 2:00 pm on Jul. 29, 2010), upcoming and/or recent calendar appointments (e.g., meeting with John at 2:30 pm on Jul. 29, 2010), recent device activity (e.g., emails sent to John regarding the 2:30 meeting), historical images from the mobile computing devices camera(s) that do not reflect the current state around the device, and states of the mobile computing device (e.g., current battery status, applications that are currently running on the mobile computing device.

For example, a mobile computing device may determine that it is currently travelling in a car based on a detected high rate of speed at which the device is travelling (e.g., using any of a variety of motion sensors that are standard components of the device), based on the device being docked in a car-adapted mobile device dock (e.g., detecting a pin arrangement for a physical electronic connection between the mobile computing device and the dock), and/or based on a navigation application that is currently running on the device (an example stat of the mobile computing device). The mobile computing device can determine an appropriate profile to use for the device based on this current context. For instance, with the car example above the mobile computing device may determine that a "hands free" profile should be used while the device is located in the car, such as turning a speaker phone feature on (activate a speaker and a microphone for the device) and turning the display off (for safety reasons).

A mobile computing device can learn location descriptions (e.g., car, home, work, etc.) and profile switching rules to use to determine when to switch profiles used by the mobile computing device. Location descriptions can be learned based on user activity (or inactivity) and a context associated with a mobile device. For instance, a mobile computing device can infer a conference room as a location description based on a meeting scheduled in an electronic calendar (accessible to the mobile computing device) for the conference room. During the duration of the meeting period, the mobile device can learn an associated context with the conference room (location description), such as available wireless networks, associated wireless network signal strengths, and ambient noise level. The mobile computing device can then identify that it is located in the conference when a context matching or within a threshold similarity to the learned context for the conference room is detected. Such an identification can be used by the mobile computing device to determine whether to switch the device's current profile and, if so, which new profile should be selected.

Rules can be learned and used by a mobile computing device to determine whether to switch a device's profile and which new profile should be selected. Rules can be learned based on user actions (or inaction) with regard to settings of the device (e.g., ringer, display, network connections, etc.) in light of changing contexts within which the device is located. For example, if a user habitually turns his ringer on with maximum volume when the device is near the wireless network "homenet" between the hours of 7 pm and 10 pm, then the device may learn a rule to select a profile corresponding to maximum ringer volume when the context includes being located near "homenet" between 7 pm and 10 pm. A mobile computing device may wait to learn a rule until a context (including identified location description) has been encountered and/or a pattern of similar actions (or inactions) has been detected for a given context at least a threshold number of times.

A mobile computing device can continue to use an automatically selected profile until a variety of ending events occur, such as the current context for the mobile computing device changing (e.g., the user removes the mobile computing device from the car), the user indicating they want to use a different profile (e.g., the user manually overriding the automatically selected device settings), and/or a battery for the mobile computing device running low on stored power when using a profile that draws a lot of power (e.g., below 10% charge remaining in the battery when using a profile with maximum screen brightness).

As described in further detail below, a mobile computing device can learn location descriptions and rules, and automatically switch profiles locally on the mobile computing device and/or in conjunction with a computer system that is remote to the mobile computing device. For example, a mobile computing device can determine its current context, learn a rule and/or location description, determine whether to switch profiles based on the current context, and switch profiles as a standalone device (e.g., without interacting with other devices over a network) and/or through interaction with other computing devices (e.g., a remote server system).

Figure 1B:
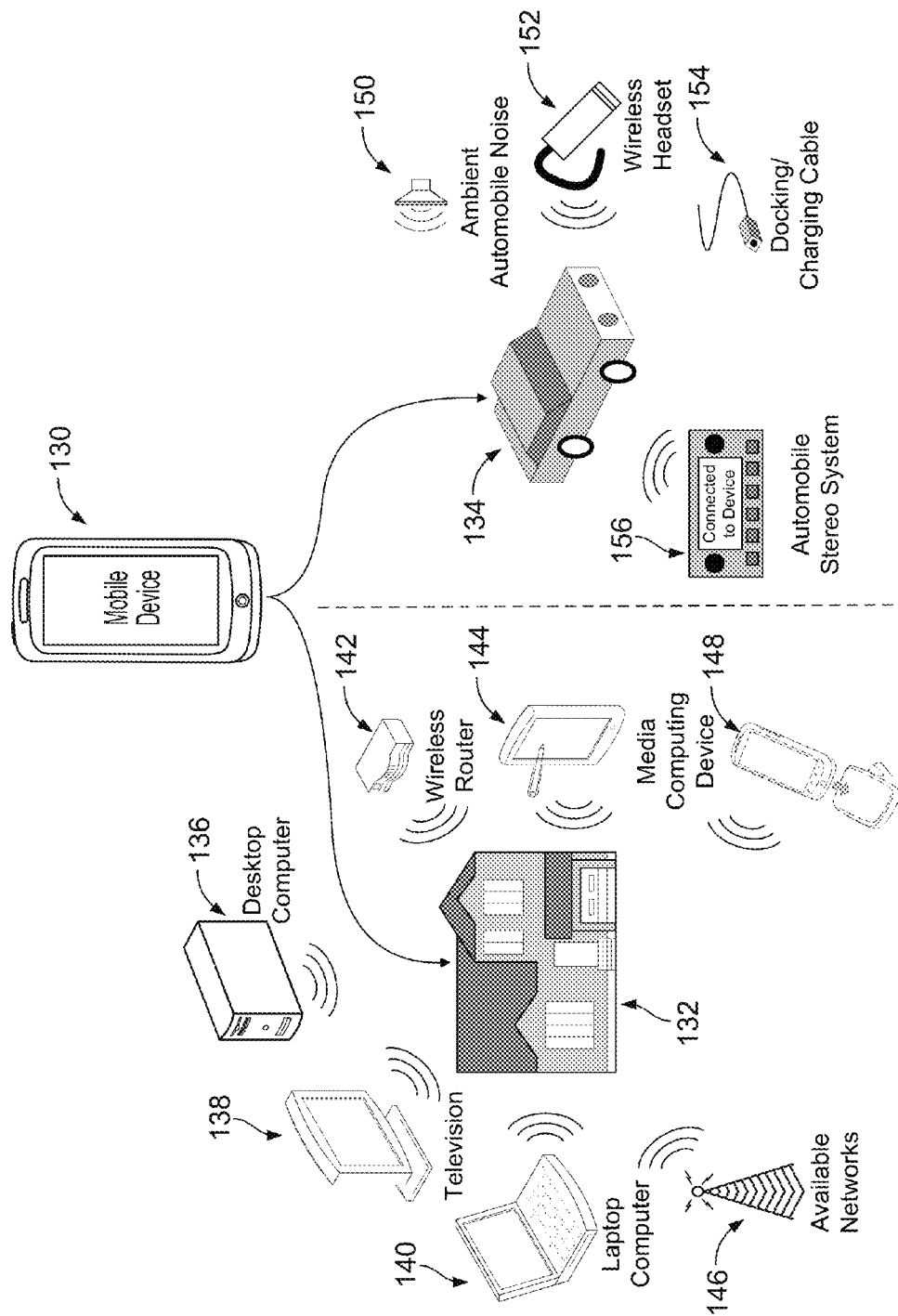
Figure 1C:
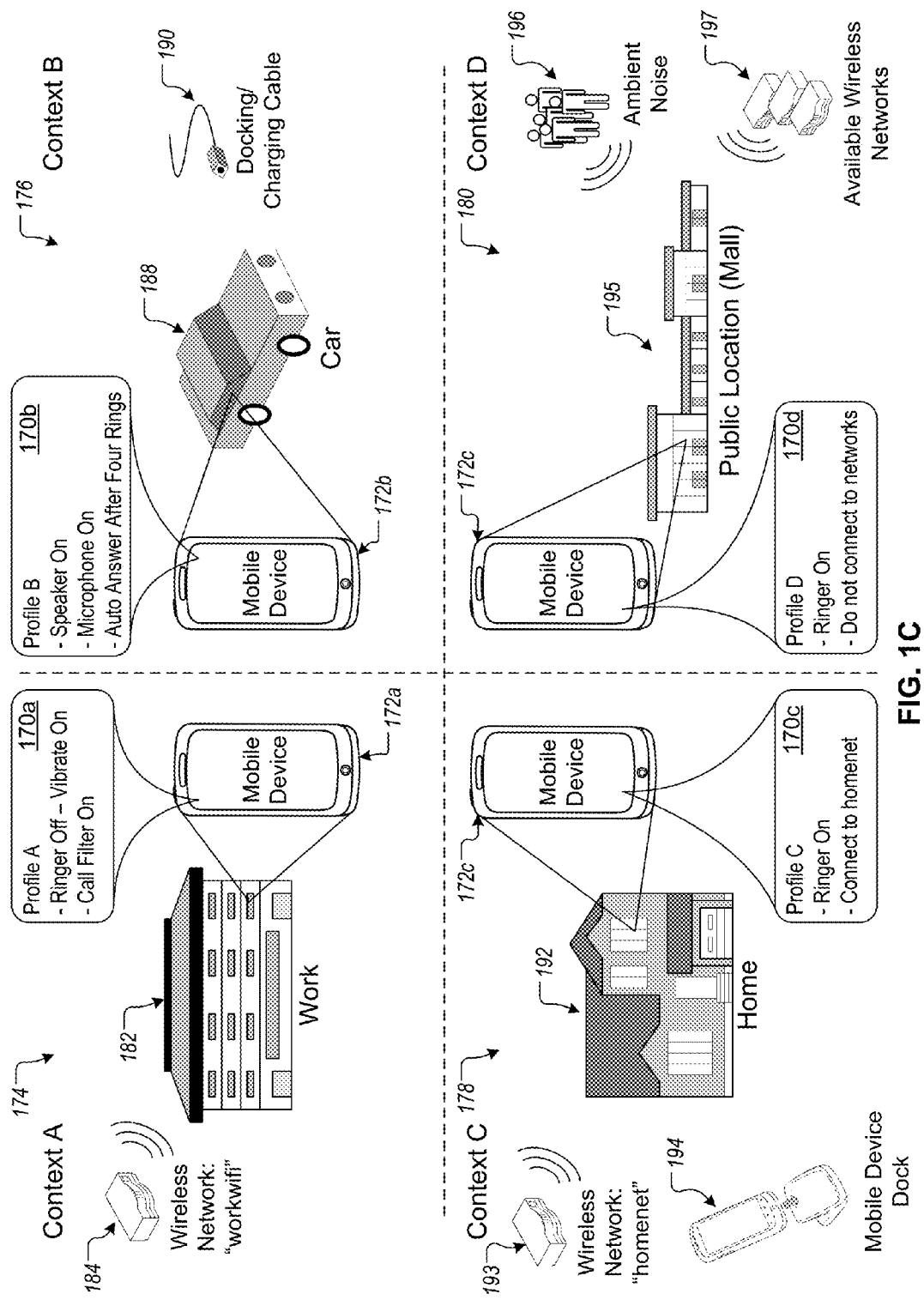

FIGS. 1A-C are conceptual diagrams of example mobile computing devices 100, 130, and 172a-d for automatically switching profiles based on context. Referring to FIG. 1A, the diagram depicts an example of a mobile computing device learning location descriptions and rules for profile switching, and then at a later time switching the profile used by the mobile computing device based on a detected context.

At step A (102), the mobile computing device 100 learns location descriptions. Location descriptions are learned based on various actions (or inaction) performed by a user with regard to the mobile computing device in light of given contexts. Location descriptions can correspond to any of a variety of locations, such as physical locations/structures (e.g., home, work, car, etc.) and/or connections to the mobile computing device (e.g., connected to "homenet" wireless network, docked in a particular type of dock, etc.).

As depicted in a log 104, the mobile computing device 100 can log various user actions (and/or inactions) and associated contexts 106a-n. These logged actions and associated contexts 106a-n can be used by the mobile computing device 100 to learn location descriptions and to learn rules for profile switching. The context recorded for each action can correspond to a context at or around the time a user action was performed. The log can also indicate a connection between logged user actions, so that the sequence of user actions and context changes can be recreated by the mobile computing device 100 when learning location descriptions and profile switching rules. Logged user actions can correspond to adjustments to settings of the mobile computing device, such as turning a ringer off, adjusting the brightness of a display, and connecting to a wireless network.

User inaction with regard to changing the settings of the mobile computing device 100 can also be included in the log 104 and used to learn location descriptions and/or rules for switching profiles. For example, the log 104 can include an entry for when a user does not change any device settings when a context associated with the mobile device 100 changes. Similarly, the log 104 can include entries corresponding to periods of time when a context for the device and/or settings for the device do not change. For instance, such entries can indicate a location description (e.g., a context and settings for the device 100 remaining the same during the evening/early morning may indicate the device 100 is located at the user's home during that period). The log 104 can also include information indicating when a user does not act in response to automatic changes by the device 100 to its current profile. Such inaction by the user can indicate an implicit acceptance of the profile change and provide hint that the automatic change was correctly performed (from the user's perspective).

Example entries 106a-n of user actions and associated contexts are depicted in the log 104. The entry 106a indicates that the user turned off the ringer of the mobile computing device 100 when the current context of the mobile computing device 100 included being within range of a wireless network "workwifi" and during a scheduled meeting in a conference room. The entry 106a further indicates that the strength of the "workwifi" signal at the time the ringer was turned off was 90%. The entry 106n indicates that the user turned on the ringer of the mobile computing device 100 when the current context of the mobile computing device 100 included being within range of the "workwifi" network, being physically connected to a computing device with the name "Work Computer" (e.g., docked to the "Work Computer" computing device), having no meetings at the time the ringer was turned on, and being performed during work hours (e.g., 9 am-5 pm). The entry 106n further indicates 20% signal strength for the "workwifi" signal at the time the ringer was turned on.

Based on these entries 106a-n, the mobile computing device 100 can learn location descriptions 108a-n. For example, the mobile computing device 100 can learn the location description "conference room" 108a based on the entry 106a, which identifies that the device 100 and/or associated user were likely located in the conference room for a meeting at or around the time the ringer was turned off. In another example, the mobile computing device 100 can learn the location description "work computer" 108n based on the entry 106n, which indicates that the device 100 and/or associated user were located at the user's work computer at the time the ringer was turned on.

The location descriptions 108a-n can be learned and stored in association with various portions of context that indicate the device 100 is physically located at the location described by the location description. For instance, the location description 108a for the conference room can be indicated by high signal strength (e.g., greater than 50%, greater than 75%, etc.) for the "workwifi" wireless network and/or a scheduled meeting currently taking place. The location description 108a can be created to include such location identifying context. In another example, the location description 108n can be indicated by a physical connection to the computing device named "work computer" and/or low signal strength (e.g., less than 50%, less than 25%, etc.) for the "workwifi" wireless network. The location description 108n can be created to include such location identifying context.

Although profile switching rules can be learned without regard for location descriptions (e.g., a learned rule could designate that a ringer should be turned off during certain scheduled events regardless of the location description), these location descriptions 108a-n can serve as anchors for learning profile switching rules. When learning profile switching rules, actions can be grouped according to an associated location description and rules can be modeled from such groups. More than one rule can be learned in association with a location description.

At step B (110), the mobile computing device 100 can learn rules for profile switching. Rules for profile switching can be used to determine when to switch the profile being used by the mobile device 100 and, if profile switching is appropriate, which profile the device 100 should use. Profiles for the mobile computing device 100 include settings for various features of the mobile computing device (e.g., ringer, display, speaker, microphone, etc.) that should be used in combination. For instance, an example speakerphone profile can instruct that a speaker be turned on, a microphone be turned on, and that other settings of the mobile computing device remain unchanged.

The rules can be learned by the mobile computing device 100 based on the logged user actions and associated contexts 106a-n, and the learned location descriptions 108a-n. In the depicted example, the mobile computing device 100 learns example profile switching rules 112a-n. The profile switching rule 112a instructs the ringer of the mobile computing device 100 be turned off when the device 100 is located in the conference room (learned location description 108a). This rule 112a can be learned based on a variety of the user actions 106a-n, including the action 106a which indicated that the mobile computing device 100 was located in the conference room (location description 108a) when the ringer was turned off. Rules can be learned so as to link important/relevant features in a context to a profile. For example, a rule can be learned (using a machine learning algorithm) to "dim the display brightness when the battery status is below 5%", regardless the location and time factors in the context. In this example, the battery status below 5% can be identified as an important feature in the context that is linked to the display dimming profile.

The profile switching rule 112n instructs the mobile computing device 100 to turn the ringer on when the device 100 is located at the work computer (location description 108n). This rule 112n can be learned based on a variety of the user actions 106a-n, including the user action 106n which indicates that the user turned the ringer on when the mobile computing device 100 was located at the work computer (connected to the work computer).

The examples provided above with regard to location description and rule learning are simplified for presentation in this document. For instance, the device 100 can wait to learn a location description and/or profile switching rule until there is a sufficient pattern of user behavior to support such a location description and/or rule. For example, a location description and/or a profile switching rule may not be created by the device 100 unless a threshold number of actions (e.g., 10, 50, 100, 1000, etc.) supporting such a location and/or rule exist.

Steps A and B (102 and 110, respectively) can be continually performed by the device 100 over an extended period of time (e.g., one week, one month, one year, etc.) to learn location descriptions and profile switching rules. Even after some locations and rules are learned, the device 100 can continue perform the steps A and B to discover new locations and rules, and to refine previously learned location descriptions and rules.

Additionally, step A (102) and/or step B (110) can be performed locally by the mobile computing device 100 and/or in conjunction with a remote computing device (e.g., a remote server system). For instance, the mobile computing device 100 can run code for a machine learning algorithm locally on the device 100 to learn location descriptions and/or profile switching rules. In another example, the mobile computing device 100 can provide a remote server system (e.g., a server system that provides telephone and/or data services to the mobile computing device) with the log 104 of user actions and, in return, can receive information from the remote server system identifying the location descriptions 108a-n and/or the profile switching rules 112a-n.

At step C (114), the mobile computing device 100 detects a current context for the mobile computing device 100 and/or a user (not depicted) associated with the mobile computing device. As depicted in the example current context, the mobile computing device 100 is current located within range of the "workwifi" network with signal strength of 75% (118a), the current date and time is Monday at 10:03 am (118b), there is a meeting scheduled in the user's electronic calendar for Monday from 10 am-11 am (118c), and the mobile computing device 100 does not currently have any physical connections to other computing devices, such as the work computer (118d). The context for the device 100 can be detected using a variety of sensors and/or data accessible to the mobile computing device 100, such as network interfaces (e.g., wireless network interface, 3G/4G network interface, USB interface, BLUETOOTH interface, etc.) and electronic calendar data and/or an electronic calendar application.

In the depicted example, at the time the current context for the mobile computing device 100 is detected, the current mobile device profile 122 includes the ringer for the device being on.

At step D (116), the mobile computing device 100 identifies a location description where the device 100 is currently located based on the current context 118a-d. To perform such identification, the device 100 references the learned location descriptions 108a-n and attempts to find a learned location description that matches the current context with at least a threshold amount of similarity. In this example, the current context 118a-d most closely resembles the identifying context associated with the location description 108a for the conference room. In particular, the high signal strength (80%) associated with the "workwifi" network indicates that the current location description is more likely to be the conference room than the work computer. Additionally, the scheduled meeting currently taking place and the lack of a physical connection (to the work computer or any other computing device) can further indicate that the device 100 is located in the conference room instead of at the work computer.

At step E (120), the mobile computing device 100 determines whether to switch the current profile to another profile based on the identified location description and the current context for the device 100. To make such a determination, the mobile device 100 can reference the learned rules 112a-n, which indicate which profiles to use in light of various location descriptions and contexts. In this example, the mobile computing device 100 determines that it should switch the current profile based on the learned rule 112a, which instructs the ringer be turned off when the device is physically located in the conference room. Since the device 100 has identified that it is located in the conference room, this rule can be applied and a profile with the ringer turned off can be applied to the device 100.

In response to determining whether to switch the profile, at step F (124) the mobile computing device 100 switches the current profile used by the device 100 as directed by the applicable rule (learned rule 112a). As indicated by the current profile 126, the ringer for the mobile computing device 100 is turned off in response to step F (124). The mobile computing device 100 can display a message 128 (or provide some other indication, such as audio output) to the user indicating that the profile has been switched. This can provide the user with the opportunity to cancel the operation if the user does not desire it to take place.

As described above, performance of the depicted steps in FIG. 1A can be performed by the mobile computing device 100 and/or in combination with a remote computing device. For instance, a remote server system may maintain the information regarding the location description 108a-n and/or the learned rules 112a-n. To identify the current location description and/or to determine whether to switch the device's profile, the mobile computing device 100 can provide information regarding the current context 118a-d to the remote server system, which can perform such operations and provide the results to the device 100. Such remote storage of location description 108a-n and/or the learned rules 112a-n can allow a user to use learned behavior across multiple devices. For instance, were the location description 108a-n and/or the learned rules 112a-n to be stored locally on the device 100 and the user loses the device 100, then the user would have to start over with the learning process. Remote implementation of such features can provide for device independent self-aware profile switching.

Referring to FIG. 1B, the example diagram provides an illustrative example of contexts associated with different location descriptions that are detectable by a mobile computing device 130. This example depicts contexts associated with a home 132 and with a car 134. The home 132 and the car 134 can be location descriptions where the mobile computing device 130 can be physically located.

At the home 132, the example context for the mobile computing device 152a is depicted as including a desktop computer 136, a television 138, a laptop computer 140, a wireless router 142, a media computing device 144, available networks 146, and a mobile device dock 148. Each of devices 136-148 may output a signal (e.g., sound, wireless data/network transmission, etc.) that the mobile computing device 130 can detect directly or indirectly. For example, the television 138 can output a wireless networking signal that the mobile computing device 130 can detect. In another example, the mobile computing device 130 can identify a wireless router 142 that provides a wireless network for the user's home 132 as well as other available networks 146, such as the wireless networks of the user's neighbors, cellular telephone networks, etc.

Similarly, the mobile computing device 130 can detect each of the devices 136-148 through direct and/or indirect connections with the devices 136-148. For example, the mobile computing device 130 can connect to a home network through the wireless router 142, though which the mobile computing device 130 can communicate with the devices 136-148. In another example, the mobile computing device 130 can identify the mobile device dock 148 through a physical docking connection. For instance, the mobile device dock 148 may be a stereo system with which the mobile computing device 130 can be docked to play music.

The context associated with the car 134 can be sufficiently distinct from the context associated with the home 134 that the mobile computing device 130 can identify the different locations. The mobile computing device 130 can determine that it is located in the car 134 based on context associated with the car 134 that includes ambient car noises 150 (e.g., engine noise, wind, etc.), a signal from and/or connection to a wireless headset 152, a connection with the docking/charging cable 154 (e.g., a mobile computing device charger powered off a cigarette lighter outlet in the car 134), and a connection with an automobile stereo system 156 (e.g., a wireless BLUETOOTH connection through which the mobile computing device can stream audio data to be played on the stereo system 156). The presence of one or more of the detected features 150-156 can indicate that the mobile computing device 130 is physically located in the car 154.

Referring to FIG. 1C, the diagram depicts an example of four different profiles 170a-d having been automatically selected and applied for a mobile computing device 172a-d (intended to be a single mobile computing device depicted in a variety of different contexts) based on four different contexts (context A 174, context B 176, context C 178, and context D 180). The profiles 170a-d can have been selected using learned location descriptions and profile switching rules, as described above with regard to FIG. 1A.

Referring to the context A 174, the mobile computing device 172a is depicted as being located at a user's place of work 182. In this example, the mobile computing device 172a is able to identify it is currently located at the location description "work" based on the presence of the wireless network "workwifi" 184 that is associated with the place of work 182. Based on the context A 174, the mobile computing device 172a can automatically switch to the profile 170a, which includes settings for the ringer to be turned off, the vibrate feature to be turned on, and for a call filter to be turned on. A call filter can be a filter that restricts the calls that are allowed to ring through on the device 172a. For example, the call filter applied with the profile 170a can filter out (or restrict) calls from callers that are not listed on a telephone contact list for the device 172a (e.g., filter out solicitors and other unknown callers). The mobile device 172a can automatically switch to the profile 170a in the context A 174 based on any of a variety of factors discussed above with regard to FIG. 1A.

Referring to the context B 176, the mobile computing device 172b is depicted as being located in the user's car 188. In this example, the mobile computing device 172b can determine its current context based on, at least, a connection with a car-adapted docking/charging cable 190. Based on the context B 176, the mobile computing device 172b can automatically switch to the profile 170b, which includes settings for the speaker and the microphone for the device 172a to be turned on, and for telephone calls to be automatically answered after four rings. For instance, it may be convenient for a user who is driving to have telephone calls automatically answer after a threshold number of rings (e.g., four rings) so that the user does not need to divert his/her attention away from the road while attempting to answer a telephone call. This determination can be based on any of a variety of factors discussed above with regard to FIG. 1A.

Context C 178 depicts the mobile computing device 172c as being located in the user's home 192. The mobile computing device 172c is able to determine its current context based on, at least, the presence of wireless network "homenet" 193 that is associated with the user's home 192 and the device 172c being placed in mobile device dock 194. As indicated previously, the mobile device 172 can distinguish between a connection to the car adapted docking/charging cable 190 and the mobile device dock 194 based on a variety of factors, such as differing pin arrangements. Based on the context C 178, the mobile computing device 172c can automatically switch to the profile 170c, which includes settings for the ringer to be turned on and to connect to the homenet wireless network for data transmissions. This determination can be based on any of a variety of factors discussed above with regard to FIG. 1A.

Context D 180 shows the mobile computing device 172d being located at a public location 195 (a shopping mall). The mobile computing device 172d determines its current context based on, at least, a relatively high level of ambient noise 196 (e.g., other shoppers talking in the shopping center 195, background music piped into the shopping center 195, etc.) and a multitude of available wireless networks 197. Based on the ambient noise 196 and the wireless networks 197, the mobile device 172d can generally infer that it is located in a public area. Based on the context D 180, the mobile computing device 172d can automatically switch to the profile 170d, which includes settings for the ringer to be turned on and to not connect to any of the available wireless networks.

The mobile computing device 172 can automatically switch between the profiles 170a-d based on changes to a current context for the mobile device as the user bring the device from one location to another. For instance, when the user leaves the office 182 with the mobile computing device 172 and gets into the car 188, the mobile computing device 172 can switch from using the profile A 170a (in the office 182) to using the profile B 170b (in the car 188).

Profiles used by the mobile computing device 172 in the different contexts 174-180 can differ among devices and/or associated users, and they can change over time. As described above with regard to FIG. 1A, a feedback loop can be used to continually refine rules for profile switching and location descriptions based on detected contexts.

Figure 2A:
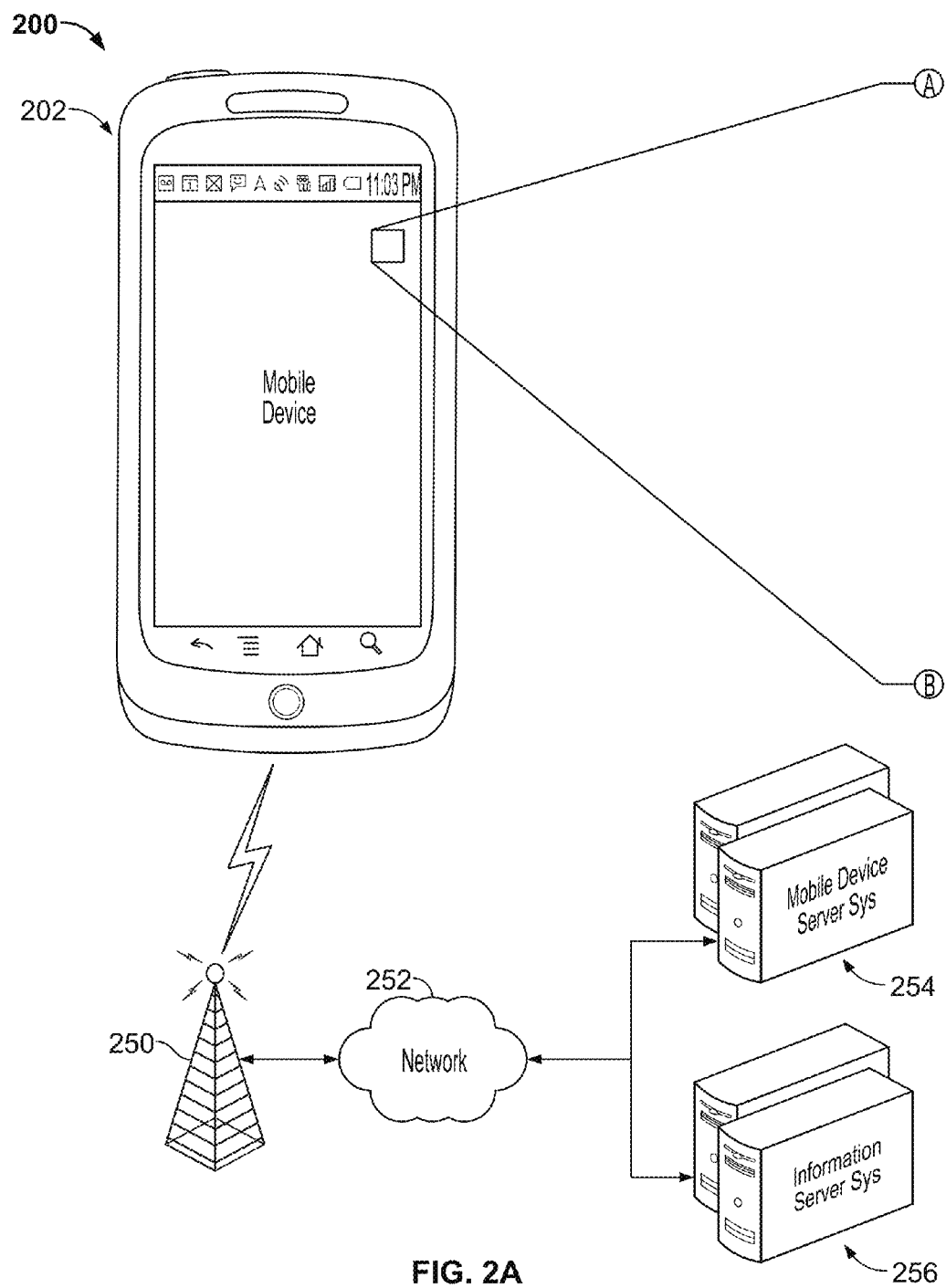
FIGS. 2A-B are diagrams of an example system for automatically switching profiles based on a current context associated with a mobile computing device.
Figure 2B:
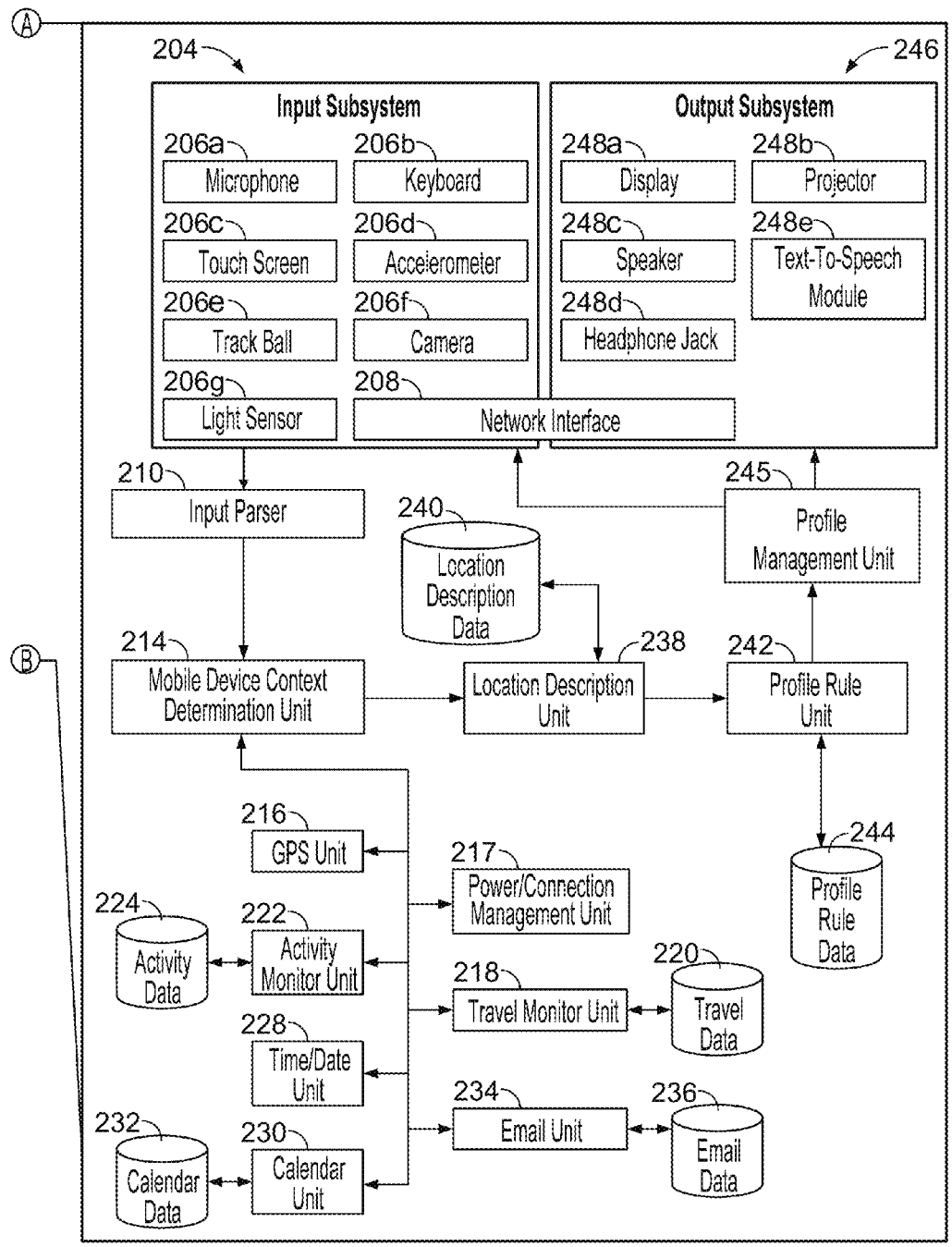

FIGS. 2A-B are diagrams of an example system 200 for automatically switching profiles based on a current context associated with a mobile computing device 202. In this example, the mobile computing device 202 is configured to automatically determine when switch profiles based on a current context associated with the mobile computing device and/or a user of the mobile computing device, similar to the mobile computing devices 102, 130, and 172 described above with regard to FIGS. 1A-C.

The mobile computing device 202 is depicted as including an input subsystem 204 through which a voice input (as well as other types of input) can be received by the mobile computing device 202. Referring to FIG. 2B, the input subsystem 204 is depicted as including a microphone 206a (configured to receive audio-based input), a keyboard 206b (configured to receive key-based input), a touchscreen 206c (configured to receive screen touch-based input), an accelerometer 206d

(configured to receive motion-based input), a trackball 206e (configured to receive GUI pointer-based input), a camera 206f (configured to receive visual input), and a light sensor 206g (configured to receive input based on light intensity). The input subsystem 204 also includes a network interface 208 (e.g., wireless network interface, universal serial bus (USB) interface, BLUETOOTH interface, public switched telephone network (PSTN) interface, Ethernet interface, cellular network interface, 3G and/or 4G network interface, etc.) that is configured to receive network-based input and output. Other types of input devices not mentioned may also be part of the input subsystem 204.

An input parser 210 of the mobile computing device 202 can be configured to receive input from the input subsystem 204, such as wireless network signals, and to provide the received input to an appropriate unit of the mobile computing device for further processing. The input parser 210 can include modules not depicted for interpreting input received through the input subsystem 204, such as a computer vision module to interpret images obtained through the camera 206f and a gesture module to interpret physical movement data provided by the accelerometer 206d.

A mobile device context determination unit 214 can determine a current context for the mobile computing device 202. The mobile device context determination unit 214 can determine a current context for the mobile device 202 using input received by the input subsystem 204 and interpreted by the input parser 210, as well as a variety of context monitoring units of the mobile computing device 202.

For instance, a global positioning system (GPS) unit 216 can provide geographic location information to the mobile device context determination unit 214. Geographic location information can be associated with location descriptions and can be used to generally indicate proximity to a location description. However, location descriptions provide a level of granularity and accuracy that may not be possible with geographic location information. A power/connection management unit 217 can provide information regarding a current power source and/or power state for the mobile computing device (e.g., connected to external power source, battery at 80% charge, etc.) as well as information regarding charging and/or communication connections for the mobile computing device 202 (e.g., device is docked, device is connected to a wireless network, etc.). A travel monitor unit 218 (in conjunction with a travel data repository 220) can provide information related to a route currently being travelled and habitual routes travelled by the mobile computing device 202. An activity monitor unit 222 (in conjunction with an activity data repository 224) can provide information related to recent and habitual user activity (e.g., applications used, specific information accessed at various times, etc.) on the mobile device 202.

A time and date unit 228 can provide current time and date information and a calendar unit 230 (in conjunction with a calendar data repository 232) can provide information related to appointments for the user. An email unit 234 (in conjunction with an email data repository 236) can provide email-related information (e.g., recent emails sent/received). The mobile context determination unit 214 can receive information from other context monitoring units not mentioned or depicted.

In some implementations, the context monitoring units 216-236 can be implemented in-part, or in-whole, remote from the mobile computing device 202. For example, the email unit 234 may be a thin-client that merely displays email-related data that is maintained and provided by a remote server system. In such an example, the email unit 234 can interact with the remote server system to obtain email-related information to provide to the mobile device context determination unit 214.

A location description unit 238 can use the current context for the mobile device 202, as determined by the mobile device context determination unit 214, to learn and identify location descriptions where the mobile computing device 202 is physically located. The location description unit 238 can perform operations for learning and identifying location descriptions, similar to the operations discussed above with regard to steps A and D depicted in FIG. 1A. The location description unit 238 can interact with a location description data repository 240 to store and retrieve information regarding learned location descriptions. Stored information can include information identifying names for location descriptions and associated context that, when detected by the mobile device 202, indicates that the device is physically located at the location description.

A profile rule unit 242 can use the current context determined by the context determination unit 214 and/or location descriptions identified by the location description unit 238 to learn and apply rules for automatically selecting context-appropriate profiles for the mobile computing device 202. The profile rule unit 242 can learn rules and apply rules in a manner similar to the steps B and E described above with regard to FIG. 1A. Additionally, the profile rule unit 242 can generate profiles and/or identify pre-existing profiles for application with the learned rules. The profile rule unit 242 can interact with a profile rule data repository 244 to store and retrieve profile switching rules and/or generated profiles. A stored rule can include a variety of information, such as information identifying contextual and/or location description criteria and information identifying a profile to be applied when the criteria is satisfied. A stored profile can include a variety of information as well, such as information identifying features of the device 202 (e.g., the microphone 206a) and an adjustments to be made to the identified features (e.g., turn on/off).

A profile management unit 245 can apply profiles automatically selected by the profile rule unit 242 to the mobile computing device 202. The profile management unit 245 can interact with, at least, the input subsystem 204 and an output subsystem 246 of the mobile computing device 202 to apply an automatically selected profile. The output subsystem 246 can include a variety of output devices, such as a display 248a (e.g., a liquid crystal display (LCD), a touchscreen), a projector 248a (e.g., an image projector capable of projecting an image external to the device 202), a speaker 248c, a headphone jack 248d, etc. The network interface 208 can also be part of the output subsystem 246 and may be configured to provide the results obtained by the result identification unit 244 (e.g., transmit results to BLUETOOTH headset). The output subsystem 246 can also include a text-to-speech (TTS) module 248e that is configured to convert text to audio data that can be output by the speaker 248c (e.g., an audio message regarding an identified location description and/or a automatically changed profiled can be audibly output using the TTS module 248e).

The profile management unit 245 can direct the input subsystem 204 and the output subsystem 246 regarding settings to be applied as part of an automatically selected profile. For instance, in response to being notified that a speakerphone profile is being automatically applied to the device 202, profile management unit 245 can direct the input subsystem 204 to activate the microphone 206a and the output subsystem 246 to activate the speaker 248c.

Referring to FIG. 2A, the mobile computing device 202 can wirelessly communicate with wireless transmitter 250 (e.g., a cellular network transceiver, a wireless network router, etc.) and obtain access to a network 252 (e.g., the Internet, PSTN, a cellular network, a local area network (LAN), a virtual private network (VPN), etc.). Through the network 252, the mobile computing device 202 can be in communication with a mobile device server system 254 (one or more networked server computers), which can be configured to provide mobile device related services and data to the mobile device 202 (e.g., provide calendar data, email data, connect telephone calls to other telephones, etc.).

The mobile device 202 can also be in communication with one or more information server systems 256 over the network 252. Information server systems 256 can be server systems that provide information that may be relevant to processing automatically switching profiles. For instance, the information server systems 256 can provide social network information for a user associated with the mobile device 202, which can be used to determine a current context and/or location descriptions associated with the device 202 (e.g., calendar event information stored on the social network, location description information for the user, etc.).

Figure 3:
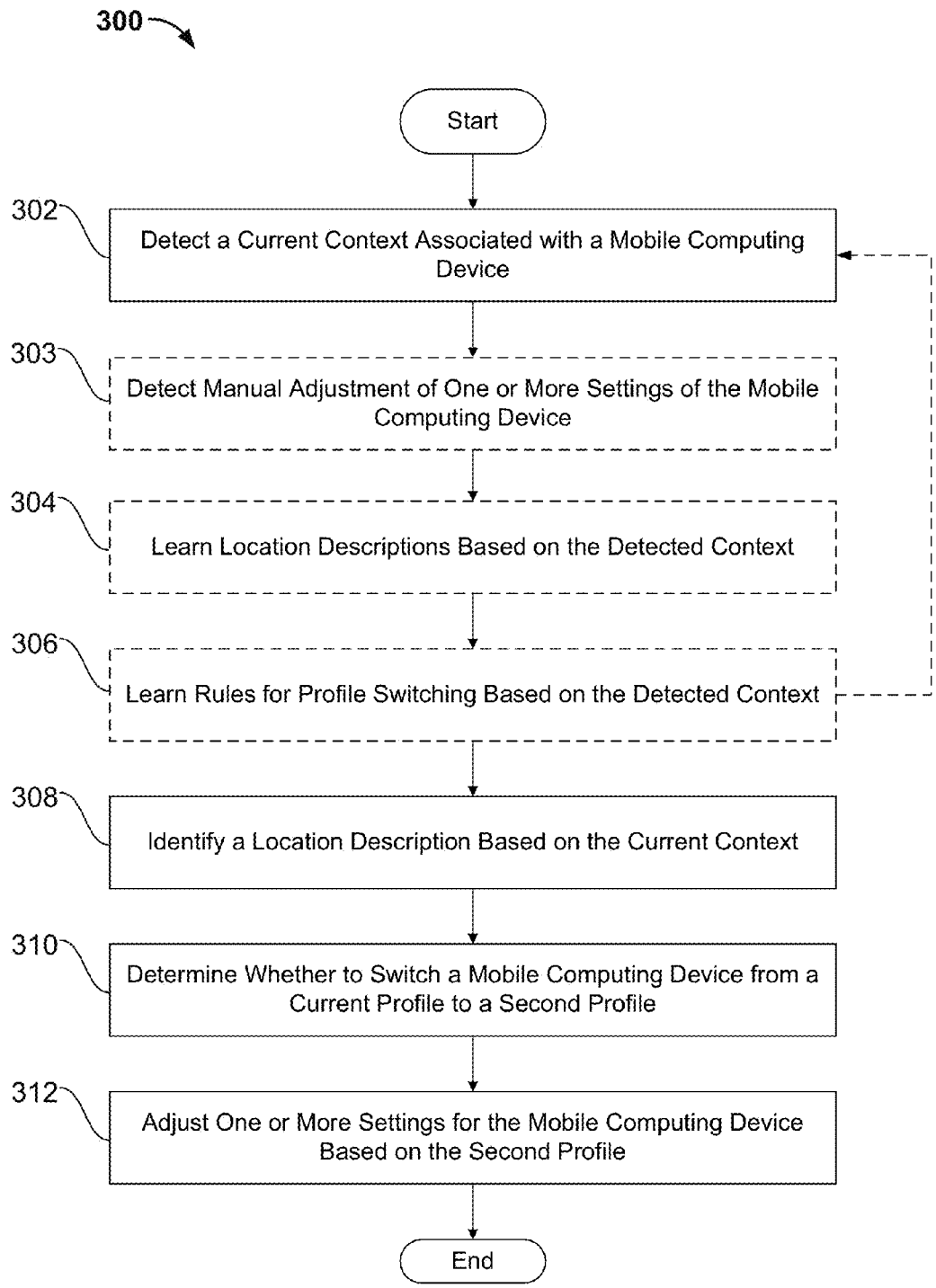
FIG. 3 is a flowchart of an example technique for automatically switching profiles for a mobile computing device based on a current context associated with the mobile computing device.

FIG. 3 is a flowchart of an example technique 300 for automatically switching profiles for a mobile computing device based on a current context associated with the mobile computing device. The example technique 300 can be performed by any of a variety of mobile computing devices, such as the mobile computing devices 100, 130, and 172 described above with regard to FIGS. 1A-C and/or the mobile computing device 202 described above with regard to FIGS. 2A-B.

The example technique 300 starts at step 302 by detecting a current context associated with a mobile computing device. For example, the mobile device context determination unit 214 can detect a current context associated with the mobile computing device 202 and/or a user of the mobile computing device 202 based on a variety of context-related information sources, such as the input subsystem 204 and context monitoring units 216-236, as described with regard to FIG. 2B.

In some implementations, manual adjustment of one or more settings (e.g., ringer on/off, speaker volume, screen brightness, etc.) of the mobile computing device can be detected (303). In such implementations, detection of the settings being manually adjusted can serve as a trigger for the mobile computing device to activate techniques to learn location descriptions and/or rules for profile switching. Such an event (manual settings adjustment) combined with the detected current context of the mobile computing device can serve as a training item for one or more algorithms to learn rules for profile switching (and/or location descriptions). The subsequent learning steps 304 and/or 306 regarding learning location descriptions and profile switching rules, respectively, can be performed based on whether the manual detection of one or more settings of the mobile computing device has been detected.

In some implementations, location descriptions can be learned based on the detected context (304). Operations for learning location descriptions can be performed similar to those described above with regard to step A (102) depicted in FIG. 1A. A location description can be learned based on detected context for a mobile computing device and additional information that indicates a name associated with the location description. Such additional information can be derived from user input indicating a name (e.g., a user can be prompted for and provide a name associated with a physical location to a mobile computing device). Additional information can also be obtained through information provided in the detected context, such as a location specified as part of a scheduled activity (e.g., meeting) in an electronic calendar and/or a name of a network and/or computing device to which the mobile computing device is connected. Additional information can also be inferred based on a time of day and a generic schedule inferred for a user (e.g., work from 9:00 am-5:00 pm on weekdays, home from 10:00 pm-7:00 am every day, etc.). For instance, if a detected context for a mobile computing device does not change from midnight to 6:00 am nearly every day, a location description of home and/or bedroom can be inferred by the mobile computing device (e.g., infer the user is sleeping during this time and, as a corollary, the user and the device are located at the user's home/bedroom).

In some implementations, rules for profile switching can be learned based on the detected context (and/or learned location descriptions) (306). Operations for learning rules can be performed similar to those described above with regard to step B (110) depicted in FIG. 1A. In particular, rules can be learned based on user adjustment of one or more settings on a mobile computing device (e.g., turning a ringer off, establishing a connection to a wireless network, etc.) in light of a detected context (and/or change in context) for the mobile computing device at or around the time the settings are adjusted. A rule can be learned after a setting has been adjusted in a similar manner at least a threshold number of times (e.g., 5, 10, 25, 50, 100, 1000, etc.) for a given context and/or location description. For instance, if a user habitually turns off a mobile device's ringer when entering a conference room for a scheduled meeting, the mobile device can learn a rule based on such setting adjustment by the user.

The steps 302-306 can be performed continually during operation of a mobile computing device. For instance, a mobile computing device can continue to learn and refine location descriptions and/or rules for profile switching during the life of the mobile computing device. Until a threshold confidence has been established by a mobile computing device for the learned location descriptions and/or rules, the mobile computing device may perform the steps 302-306 without performing automatic profile switching steps (308-312). A confidence level may be indicated by a number and/or percentage of instances that reinforce a learned location description and/or rule.

At step 308, a location description at which a mobile computing device is physically located can identified be based on the current context detected at step 302. For example, the location description unit 238 of the mobile computing device 202 can identify a location description based on current context detected by the context determination unit 214, as described with regard to FIGS. 2A-B. Operations for identifying a location description can be performed similar to those described above with regard to step D (116) depicted in FIG. 1A.

A determination can be made as to whether a mobile computing device should switch from a currently used profile to a second profile (310). Such a determination can be based on the identified location description and the detected current context. In particular, portions of the detected context that are indicative of a current activity associated with the device and/or a user of the device (e.g., attending a meeting) can be used to determine whether to switch profiles. Current activity information can be derived from a variety of sources, such as an electronic calendar to which the mobile computing device has access and/or social networks. Social network information (e.g., status updates, events, photos, etc.) can be used to identify a current activity associated with the device and/or a user of the device. Operations for determining whether to switch a device's profile can be performed similar to those described above with regard to step E (120) depicted in FIG. 1A.

At step 312, one or more settings for the mobile device can be adjusted based on the second profile in response to a determination to switch from the current profile to the second profile. The one or more settings that are changed and the manner of changing them (e.g., turn ringer off, turn display on, etc.) can be provided by the second profile. For example, the profile management unit 245 can direct the input subsystem 204 and/or the output subsystem 246 of the mobile computing device 202 to change settings for various features of the device 202 (e.g., input and output devices 206a-g, 208, and 248a-e). The technique 300 can end after step 312.

Figure 4:
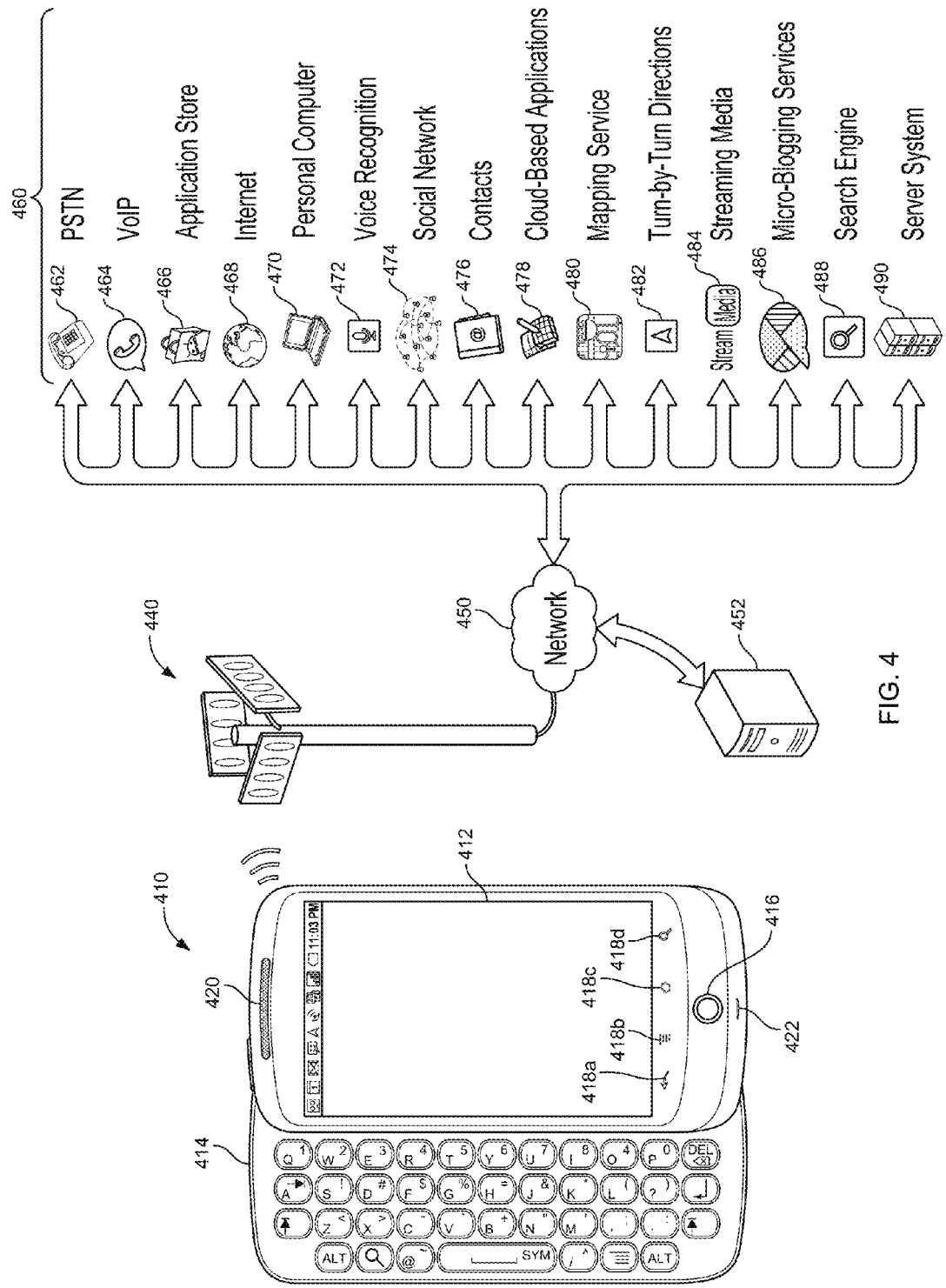
FIG. 4 is a conceptual diagram of a system that may be used to implement the techniques, systems, mechanisms, and methods described in this document.

FIG. 4 is a conceptual diagram of a system that may be used to implement the techniques, systems, mechanisms, and methods described in this document. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and '#'. The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile computing device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
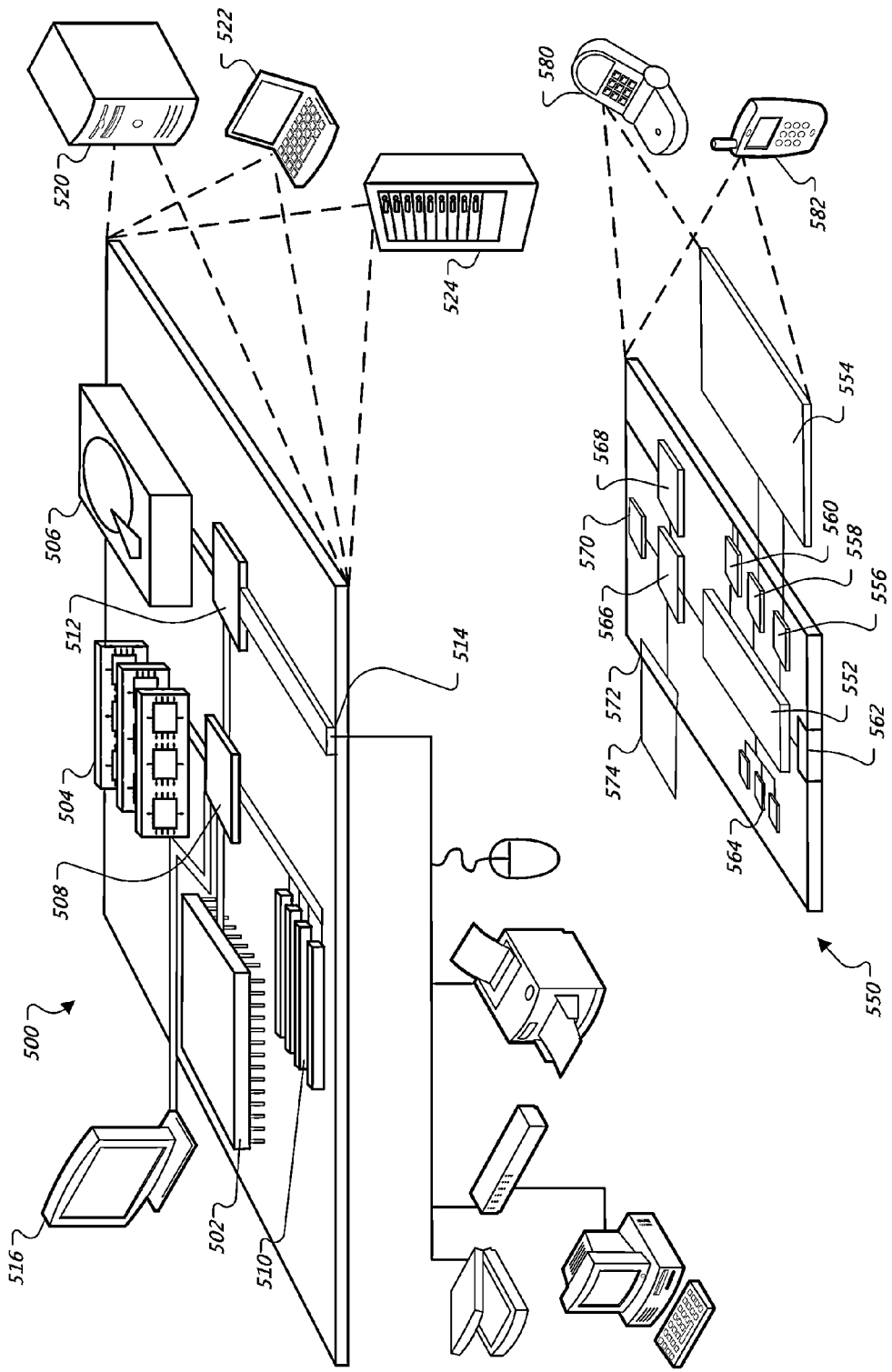
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for automatically monitoring for voice input may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    detecting, by a mobile computing device, a current context associated with the mobile computing device, the current context being external to the mobile computing device and indicating a current state of the mobile computing device in its surrounding environment, wherein the current context includes information that identifies a received signal strength, at the mobile computing device, of a short or medium-range wireless network that the mobile computing device is currently able to access, and wherein the current context further includes information from a scheduling application that identifies scheduled activities for a user who is associated with the mobile computing device;
    comparing the received signal strength to a plurality of values of received signal strengths for the short or medium-range wireless network, the plurality of values of received signal strengths being associated with a plurality of different physical locations;
    identifying, based on at least the comparison of the received signal strength to the plurality of values of received signal strengths, a particular physical location where the mobile computing device is currently located from among the plurality of different physical locations from which the mobile computing device is able to access the short or medium-range wireless network;
    determining, based on the current context, a current activity of the user;
    determining, based on the identified particular physical location and the determined current activity of the user, whether to switch the mobile computing device from operating using a current profile to operating using a second profile, wherein the current profile and the second profile each define one or more settings of the mobile computing device, and wherein determining whether to switch the mobile computing device to operating using the second profile is based on applying one or more learned rules to the identified particular physical location and the determined current activity of the user; and
    in response to determining whether to switch to the second profile, adjusting one or more setting of the mobile computing device based on the second profile,
    further comprising, over a period of time before determining whether to switch the mobile computing device to operating using the second profile, defining the rules based on user adjustment of the settings of the mobile computing device and a detected context or change in context of the mobile computing device at or around a time the settings were adjusted.

2. The computer-implemented method of claim 1, wherein the particular physical location is associated with a name and not with a unique geographic location identifier.

3. The computer-implemented method of claim 2, wherein the particular physical location is selected from the group consisting of: home, car, work, and public location.

4. The computer-implemented method of claim 1, wherein
    the current context further includes first information that identifies one or more other computing devices that are located nearby the mobile computing device, and
    the particular physical location is identified further based on the first information.

5. The computer-implemented method of claim 4, wherein the other computing devices are identified through, at least, one or more wired or wireless connections that are available to the mobile computing device.

6. The computer-implemented method of claim 5, wherein the one or more wired or wireless connections include a wired connection through which the mobile computing device is docked.

7. The computer-implemented method of claim 1, wherein the current context further includes one or more calendar entries from an electronic calendar for the user, the one or more calendar entries identifying one or more events that were scheduled to occur at a previous time or that are scheduled to occur at a future time that is within a threshold period from a current time.

8. The computer-implemented method of claim 1, wherein the current context further includes social network information associated with the user on one or more social networks, and the current activity of the user is determined based, at least in part, on the social network information.

9. The computer-implemented method of claim 1, further comprising, at a previous time before identifying the particular physical location, defining a location description for the particular physical location based on a detected context for the mobile computing device at the previous time and additional information that indicates a name for the location description.

10. The computer-implemented method of claim 9, wherein the additional information comprises user input that indicates the name for the location description.

11. The computer-implemented method of claim 9, wherein the additional information comprises a location specified as part of a scheduled activity in an electronic calendar associated with the mobile computing device.

12. The computer-implemented method of claim 9, wherein the additional information comprises an inferred location based on, at least, a time of day and a generic schedule inferred for a user of the mobile computing device.

13. The computer-implemented method of claim 1, wherein a new rule is learned by the mobile device once a particular setting adjustment has been made at least a threshold number of times in association with a particular context of the mobile computing device.

14. The computer-implemented method of claim 1, wherein the settings of the mobile computing device defined by the current profile and the second profile include one or more of the following: speaker activation, speaker volume, microphone activation, display activation, display brightness, ringer activation, ringer volume, vibrate activation, ringtone, communications network connection, and communications filter activation.

15. A system for switching profiles on mobile computing device, the system comprising:
 a mobile computing device;
 a context determination unit of the mobile computing device that is configured to detect a current context associated with the mobile computing device, the context being external to the mobile computing device and indicating a current state of the mobile computing device in its surrounding environment, wherein the current context includes information that identifies a received signal strength, at the mobile computing device, of a short or medium-range wireless network that the mobile computing device is currently able to access, and wherein the current context further includes information from a scheduling application that identifies scheduled activities for a user who is associated with the mobile computing device;
 a location description unit of the mobile computing device that is configured to i) compare the received signal strength to a plurality of values of received signal strengths for the short or medium-range wireless network, the plurality of values of received signal strengths being associated with a plurality of different physical locations, and ii) identify, based on at least the comparison of the received signal strength to the plurality of values of received signal strengths, a particular physical location where the mobile computing device is currently located from among the plurality of different physical locations at which the mobile computing device is able to access the short or medium-range wireless network;
 a profile rule unit of the mobile computing device that is configured to determine, based on the identified particular physical location and a current activity of the user that is determined from the current context, whether to switch the mobile computing device from operating using a current profile to operating using a second profile, wherein the current profile and the second profile each define one or more settings of the mobile computing device, and wherein determining whether to switch the mobile computing device to operating using the second profile is based on applying one or more learned rules to the identified particular physical location and the determined current activity of the user, and wherein the profile rule unit is further configured to, over a period of time before determining whether to switch the mobile computing device to operating using the second profile, define the rules based on user adjustment of the settings of the mobile computing device and a detected context or change in context of the mobile computing device at or around a time the settings were adjusted; and
 a settings management unit of the mobile computing device that is configured to adjust one or more setting of the mobile computing device based on the second profile in response to determining whether to switch to the second profile.

16. A computer program product tangibly embodied in one or more non-transitory machine-readable storage devices, the computer program product including instructions that, when executed, cause operations to be performed, the operations comprising:
 detecting, by a mobile computing device, a current context associated with the mobile computing device, the context being external to the mobile computing device and indicating a current state of the mobile computing device in its surrounding environment, wherein the current context includes information that identifies a received signal strength, at the mobile computing device, of a short or medium-range wireless network that the mobile computing device is currently able to access, and wherein the current context further includes information from a scheduling application that identifies scheduled activities for a user who is associated with the mobile computing device;
 comparing the received signal strength to a plurality of values of received signal strengths for the short or medium-range wireless network, the plurality of values of received signal strengths being associated with a plurality of different physical locations;
 identifying, based on at least the comparison of the received signal strength to the plurality of values of received signal strengths, a particular physical location where the mobile computing device is currently located from among the plurality of different physical locations from which the mobile computing device is able to access the short or medium-range wireless network;
 determining, based on the current context, a current activity of the user;
 determining, based on the identified particular physical location and the determined current activity of the user, whether to switch the mobile computing device from operating using a current profile to operating using a second profile, wherein the current profile and the second profile each define one or more settings of the mobile computing device, and wherein determining whether to switch the mobile computing device to operating using the second profile is based on applying one or more learned rules to the identified particular physical location and the determined current activity of the user; and in response to determining whether to switch to the second profile, adjusting one or more setting of the mobile computing device based on the second profile, the operations further comprising, over a period of time before determining whether to switch the mobile computing device to operating using the second profile, defining the rules based on user adjustment of the settings of the mobile computing device and a detected context or change in context of the mobile computing device at or around a time the settings were adjusted.

17. The computer-implemented method of claim 7, wherein the particular physical location is identified further based on one or more locations designated for the one or more calendar entries.

18. The computer-implemented method of claim 7, wherein the current activity of the user is determined based, at least in part, on the one or more events that are identified by the one or more calendar entries.

* * * * *